US006646635B2

(12) United States Patent
Pogatetz et al.

(10) Patent No.: US 6,646,635 B2
(45) Date of Patent: *Nov. 11, 2003

(54) STYLUS APPARATUS AND METHOD FOR TRANSMITTING LIGHT

(75) Inventors: Douglas J. Pogatetz, Arlington Heights, IL (US); Kevin J. Schechtel, Algonquin, IL (US); William L. Bollig, Elk Grove, IL (US)

(73) Assignee: 3Com Corporation, Rolling Meadows, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 197 days.

(21) Appl. No.: 09/765,895

(22) Filed: Jan. 19, 2001

(65) Prior Publication Data
US 2002/0097232 A1 Jul. 25, 2002

(51) Int. Cl.[7] ................................................. G09G 3/02
(52) U.S. Cl. ..................... 345/179; 345/156; 345/182; 345/183; 128/18.09; 128/19.01; 128/19.05; 385/115
(58) Field of Search ................................. 345/156, 179, 345/182, 183; 178/18.09, 19.01, 19.05; 385/115

(56) References Cited

U.S. PATENT DOCUMENTS

| 4,251,826 | A | * | 2/1981 | Schwartz et al. | 346/150.2 |
| 4,913,505 | A | * | 4/1990 | Levy | 264/1.24 |
| 5,287,121 | A | * | 2/1994 | Louis et al. | 178/18.01 |
| 5,572,613 | A | * | 11/1996 | Kingsbury | 385/115 |
| 5,772,304 | A | * | 6/1998 | Smith | 362/31 |
| 5,988,842 | A | * | 11/1999 | Johnsen et al. | 200/314 |
| 6,154,200 | A | * | 11/2000 | Challener et al. | 345/179 |
| 6,250,143 | B1 | * | 6/2001 | Bindell et al. | 216/11 |
| 6,266,476 | B1 | * | 7/2001 | Shie et al. | 359/443 |
| 6,445,577 | B1 | * | 9/2002 | Madsen et al. | 361/683 |

* cited by examiner

*Primary Examiner*—Bipin Shalwala
*Assistant Examiner*—Vincent E. Kovalick
(74) *Attorney, Agent, or Firm*—Baniak Pine & Gannon

(57) ABSTRACT

A stylus apparatus and method includes a manually operable lightpipe for transmitting light. The manually operable lightpipe includes a body portion for transmitting the light, the body portion having an outer surface. The manually operable lightpipe further including a receiving end portion for receiving the light, and a display end portion for displaying the light. A protective cover layer is positioned over outer surface of the body portion to direct the light from the receiving end portion to the display end portion and to prevent the light from exiting the body portion through the outer surface of the body portion.

22 Claims, 2 Drawing Sheets

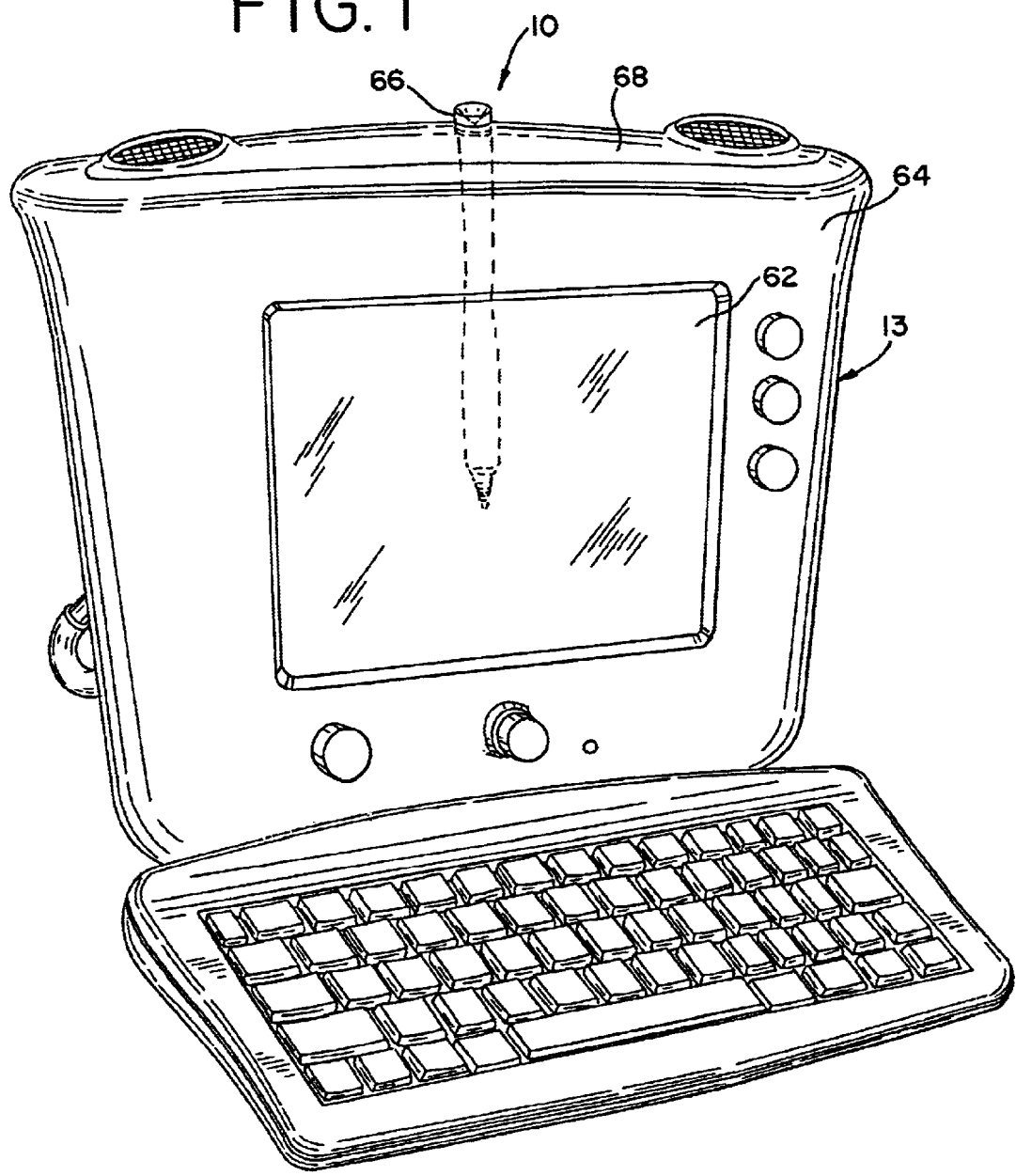

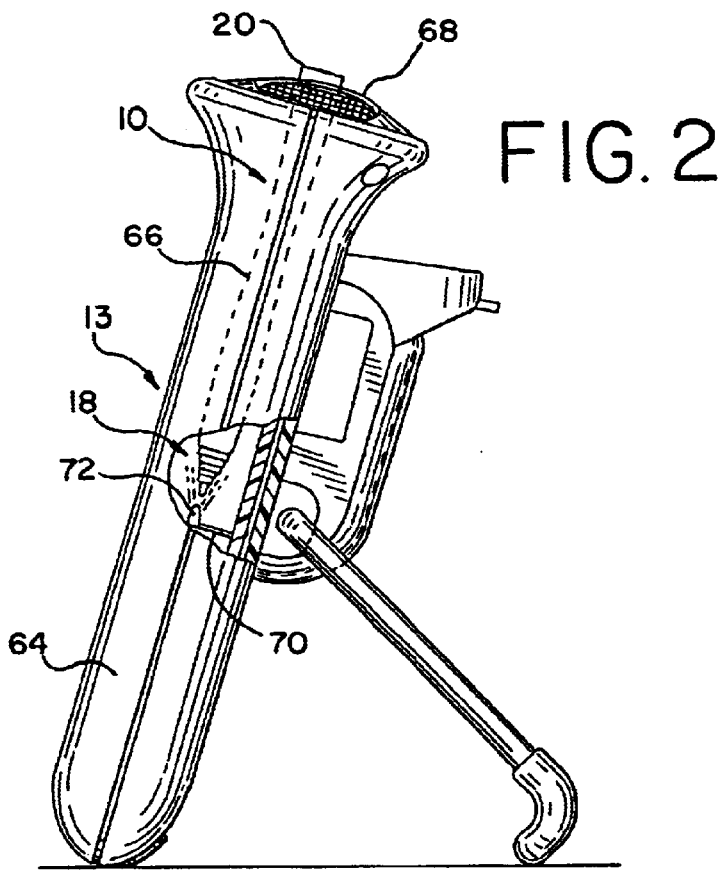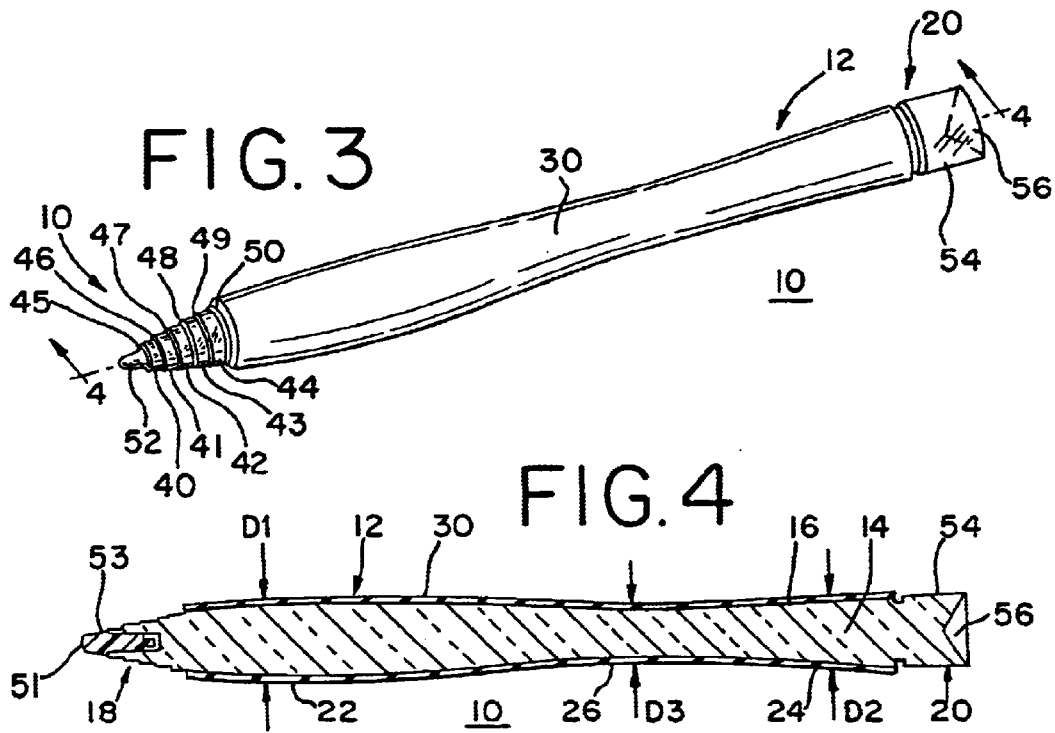

STYLUS APPARATUS AND METHOD FOR TRANSMITTING LIGHT

FIELD OF THE INVENTION

This invention relates generally to the field of light transmission devices and in particular, to a stylus apparatus and method for transmitting light.

BACKGROUND OF THE INVENTION

Conventional handheld computing devices such as, for example, the Palm Pilot manufactured and sold by 3Com Corporation, of Santa Clara, Calif., typically include a touch sensitive display screen and a stylus. These handheld computing devices are commonly referred to as personal digital assistants (PDA). The stylus for these PDA's is a writing utensil that enables the operator to input data into the device via the display screen. The stylus is typically shaped like a small thin pencil or pen to allow the user to grasp and manipulate the stylus. These PDA's typically include a housing having an elongated slot, which is usually formed adjacent to a side wall of the housing, and extends downward from the top wall of the housing. The slot is configured to receive and house the stylus when the stylus is not in use.

In response to consumer demand and technological advances, other types of specialized computing devices have been designed to provide a combination of PDA-like functions with more powerful applications, like full feature Internet conductivity and e-mail capability. These specialized computing devices are typically smaller than a conventional personal computer (PC), and yet larger than a conventional PDA. These specialized computing devices are oftentimes referred to as a personal computing appliance (PCA). These devices may also be referred to as an Internet appliance (when provided with Internet capability) or electronic computing appliance. Typically these devices are relatively small (about the size of a sub-notebook) compared to conventional personal computers, have a relatively small footprint and, while more portable than many "portable computers," are intended to be used as a countertop computing device.

A conventional PCA typically may include an outer housing, a central processing unit "CPU," computer readable program code, and a touch activated screen. A stylus is typically provided to allow a user to input data into the device via the display screen. The housing of the PCA may have an elongated slot that may be formed in the middle of the device, and may extends downward from a top wall of the housing. The slot is configured to receive and house the stylus when the stylus is not in use.

The stylus may also be configured to perform a dual function, that is, to serve as a light indicator when it is stowed within the slot. In order to accomplish this, the stylus may be formed from a transparent material such as, for example, a polycarbonate plastic. When the stylus is fully inserted into the slot, the top portion of the stylus extends through the top wall of the housing and is visible to the user. As a result, when in the stowed position, the stylus transfers light from an LED (light emitting diode) mounted on a circuit board within the device to the top portion of the stylus thereby allowing the user to monitor the various functions of the PCA. In particular, when the LED is turned on and emits visible light, the light is transferred through the first end of the stylus, up through the body portion of the stylus, and exits through the top portion of the stylus to a position outside of the outer casing to provide notice to the user.

There are several disadvantages to these conventional styluses. For example, because they are constructed from a transparent material, there is a considerable of amount of light loss as the light travels through the stylus thereby decreasing the light intensity to the user to unacceptable levels. Also, these conventional transparent styluses are typically constructed from a hard plastic material. As a result, the outer surface of the stylus has a slippery feel that makes it difficult for the user to grasp and manipulate the stylus. The outer surface is also hard and cold to the touch, and therefore is not aesthetically pleasing to the user. Finally, the outer surface of the hard plastic material is susceptible to scratching during normal use.

Accordingly, it would be desirable to have a stylus apparatus and method for transmitting light that overcomes the disadvantages described above.

SUMMARY OF THE INVENTION

One aspect of the invention provides a stylus apparatus including a manually operable lightpipe for transmitting light. The manually operable lightpipe includes a body portion for transmitting the light, the body portion including an outer surface. The manually operable lightpipe further includes a receiving end portion for receiving the light and a display end portion for displaying the light. A protective cover layer is positioned over the outer surface of the body portion to direct the light from the receiving end portion to the display end portion and to prevent the light from exiting the body portion through the outer surface of the body portion. The manually operable lightpipe may preferably be comprised of a transparent material such as, for example, a polycarbonate. The receiving end portion may preferably include a plurality of spaced-apart stepped portions, and may preferably have a conical shape. A tip member may also be provided. The tip member may preferably be connected to the receiving end portion of the manually operable lightpipe. The tip member may preferably have a conical shape. The receiving end portion may preferably include an opening formed therein, and the tip member may preferably be received in the opening. The tip member may preferably have an opaque outer surface. The display end portion may preferably include a frosted outer layer to distribute the light. The protective cover layer may preferably be comprised of an insulative material such as, for example, santoprene. The display end portion may preferably include a recess formed therein, and may preferably have a conical shape. Similarly, the manually operable lightpipe may preferably have a cylindrical shape. The receiving end portion may preferably be positioned opposite the display end portion. The body portion may preferably include a first portion having a first diameter adjacent to the receiving end portion, a second portion having a second diameter adjacent to the display end portion, and a third portion having a third diameter. The third portion may preferably be disposed between the first portion and the second portion wherein the third diameter is less than first diameter and the second diameter. The first diameter may preferably be greater than the second diameter and the third diameter. A light source may preferably be in communication with the receiving end portion of the manually operable lightpipe. The light source may preferably be a light emitting diode. A circuit board may also be provided, and the light source may preferably be mounted to the circuit board.

Another aspect of the invention provides a method of transmitting light through a lightpipe apparatus. A manually operable lightpipe including a body portion having an outer surface is provided. The manually operable lightpipe further includes a receiving end portion and a display end portion. A protective cover layer is positioned over outer surface of the body portion. The light is transmitted into the receiving end portion of the manually operable lightpipe. The light is then transmitted from the receiving end portion to the body portion. Next, the light is transmitted through the body portion to the display end portion. The light is prevented from exiting the body portion through the outer surface of the body portion.

Another aspect of the invention provides a personal computing appliance including an outer protective enclosure having a receiving slot formed therein. A circuit board is mounted within protective enclosure, and a light source for generating light is mounted on the circuit board. A lightpipe apparatus is disposed within the receiving slot. The lightpipe apparatus includes a manually operable lightpipe for transmitting the light. The manually operable lightpipe includes a body portion for transmitting the light, the body portion including an outer surface. The manually operable lightpipe further includes a receiving end portion for receiving the light and a display end portion for displaying the light. A protective cover layer is positioned over outer surface of the body portion to direct the light from the receiving end portion to the display end portion and to prevent the light from exiting the body portion through the outer surface of the body portion.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 1 is a perspective view of a preferred embodiment of a lightpipe apparatus that that is made in accordance with the invention wherein the lightpipe apparatus is shown inserted within a personal computing appliance;

FIG. 2 is a partial cutaway side view of the embodiment of FIG. 1;

FIG. 3 is a perspective view of the lightpipe apparatus shown in FIGS. 1 and 2; and FIG. 4 is a sectional view taken along lines 4–4 of FIG. 3.

DETAILED DESCRIPTION OF THE PRESENTLY PREFERRED EMBODIMENTS

Referring to FIGS. 1–4, a preferred embodiment of a stylus apparatus is shown generally at numeral 10. Referring to FIGS. 3 and 4, the stylus apparatus 10 includes a manually operable lightpipe 12. The manually operable lightpipe 12 provides a dual function because it serves both as a light indicator for an electronic device and as a writing utensil that can be used to input data into the electronic device (through a touch activated screen). The electronic device may preferably be any electronic device such as, for example, a personal computing appliance such as the one shown generally at numeral 13 in FIGS. 1 and 2. The personal computing appliance 13 may be any of the commercially available electronic devices having a central processing unit "CPU," computer readable program code, and a touch activated display screen.

Referring again to FIGS. 1–4, the manually operable lightpipe 12 is preferably be shaped like a pen or pencil, and has a generally cylindrical shape. However, it should be understood that the shape and configuration of the manually operable lightpipe 12 may vary depending upon the particular application. The manually operable lightpipe 12 may preferably be comprised any solid transparent member for transmitting visible light such as, for example, a polycarbonate.

As shown in FIG. 4, the manually operable lightpipe 12 includes a body portion 14 for transmitting light. The body portion 14 includes an outer surface 16. The manually operable lightpipe 12 also includes a receiving end portion 18 and a display end portion 20. In the embodiment shown, for example, the receiving end portion 18 and the display end portion 20 are each formed integral with the body portion 14. The receiving end portion 18 receives visible light generated by a light source as will be more fully discussed below. The body portion 14 acts as a passageway to direct the visible light from the receiving end portion 18 to the display end portion 20. The display end portion 20 displays the visible light to the operator of the personal computing appliance 13.

Referring to FIG. 4, the body portion 14 may preferably include a first portion 22 having a first diameter D1 adjacent to the receiving end portion 18. The body portion 14 may also include a second portion 24 having a second diameter D2 adjacent to the display end portion 20. Finally, the body portion 14 may preferably include a third portion 26 having a third diameter D3. In the embodiment shown, the third portion 26 is disposed between the first portion 22 and the second portion 24. The third diameter D3 is less than first diameter D1 and the second diameter D2. Also, the first diameter D1 is greater than the second diameter D2 and the third diameter D3. Thus, the body portion 14 may preferably have somewhat of an hourglass shape.

As shown in FIGS. 3 and 4, a protective cover layer 30 is positioned over outer surface 16 of the body portion 14. In the embodiment shown, the protective cover layer 30 is only applied over the outer surface 16 of the body portion 14, and does not cover the receiving end portion 18 or the display end portion 20. The protective cover layer 30 directs the visible light from the receiving end portion 18 to the display end portion 20 and prevents the visible light from exiting the body portion 14 through the outer surface 16 of the body portion 14. Containing the visible light within the body portion 14, and directing the visible light from the receiving end portion 18 to the display end portion 20 greatly improves the visibility of the display end portion 20 to the operator. The protective cover layer 30 may preferably be comprised of an insulative material. For example, the protective cover layer 30 may be comprised of santoprene. The protective cover layer 30 may preferably be any color depending upon the particular application. The protective cover layer 30 may preferably be applied to the outer surface 16 of the body portion 14 in any conventional manner. For example, the protective cover layer 30 may preferably be applied to the outer surface 16 of the body portion 14 by any conventional molding process. The thickness of the protective cover layer 30 may vary depending upon the particular application. In addition to preventing light from exiting out through the outer surface 16 of the body portion 14, the protective cover layer 30 prevents the outer surface 16 of the body portion 14 from being scratched during normal operation conditions. Moreover, the protective cover layer 30 provides an improved, softer and more tactile gripping surface for the operator, thereby increasing the amount of grip for the operator. This reduces the unintended release of the manually operable lightpipe 12 from the operator's hand during operation.

Referring again to FIG. 3, the receiving end portion 18 of the manually operable lightpipe 12 includes a plurality of spaced-apart stepped portions 40, 41, 42, 43, and 44. The stepped portions 40, 41, 42, 43, and 44 form a plurality of corresponding ring-shaped surfaces 45, 46, 47, 48, 49, and 50 that receive the light from the light source, as will be discussed in more detail below. The receiving end portion 18 may preferably have a conical shape, although other shapes and configurations are contemplated. As shown in FIG. 4, a tip member 51 may also be provided. The tip member 51 may preferably be provided to make contact with a touch activated screen of the personal computing appliance 13. The tip member 51 may also have a conical shape, although other shapes and configurations are contemplated. As shown in FIG. 3, the tip member 51 may preferably have an opaque outer surface 52. The receiving end portion 18 may preferably include an opening 53 formed therein, and the tip member 51 may preferably be received in the opening 53.

As shown in FIGS. 3 and 4, the display end portion 20 includes a viewing surface 54. The viewing surface 54 of the display end portion 20 may preferably be frosted. The frosted viewing surface 54 distributes the rays of visible light as they pass through the display end portion 20 thereby resulting in the display end portion 20 having a desirable soft glowing appearance. The display end portion 20 may also include a recess 56 formed therein. The recess 56 may preferably have a conical shape, although other shapes and configurations are contemplated. In the embodiment shown, the receiving end portion 18 is positioned opposite the display end portion 20.

As mentioned above, the stylus apparatus 10 may preferably be used with any personal computing appliance 13. As shown in FIG. 1, the personal computing device 13 may include a touch activated screen 62 and an outer protective enclosure 64. The outer protective enclosure 64 may preferably include a receiving slot 66 formed therein. In the embodiment shown in FIGS. 1 and 2, the receiving slot 66 may preferably extend from a top portion 68 of the enclosure 64 in a downwardly direction. The receiving slot 66 may preferably be configured to receive the stylus apparatus 10. When the stylus apparatus 10 is fully inserted into the receiving slot 66, the display end portion 20 extends outward beyond the top portion 68 of the enclosure 64 to allow an operator to view the display end portion 20. The personal computing appliance 13 includes a conventional circuit board 70 mounting within the enclosure 64. A light source 72 for generating visible light may preferably be mounted on the circuit board 70. The light source 72 may preferably be any conventional light source such as, for example, a light emitting diode.

When in use, the stylus apparatus 10 may be used by an operator to input data into the personal computing appliance 13 by contacting the tip member 51 of the stylus apparatus 10 against the touch activated screen 62 of the personal computing appliance 13. When the stylus apparatus 10 is not in use and is inserted within the receiving slot 66, the light source 72 is in communication with the receiving end portion 18 of the body portion 14 (see FIG. 2). As a result, when the light source 72 is emitting light, the light is transmitted to the receiving end portion 18 of the body portion 14. In particular, the light is transmitted through the plurality of ring-shaped surfaces 45, 46, 47, 48, 49, and 50 of the receiving end portion 18. The light is thereafter transmitted from the receiving end portion 18 to the body portion 14. The light is then transmitted through the body portion 14 to the display end portion 20, and ultimately exits through the display end portion 20. The protective cover layer 30 positioned over the outer surface 16 of the body portion 14 prevents the light from exiting the body portion 14 through the outer surface 16 of the body portion 14.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A stylus apparatus comprising:
a manually operable lightpipe for transmitting light, the manually operable lightpipe including a body portion for transmitting the light, the body portion including an outer surface, the manually operable lightpipe further including a receiving end portion for receiving the light and a display end portion for displaying the light, a protective cover layer comprised of an insulative material positioned over the outer surface of the body portion to direct the light from the receiving end portion to the display end portion and to prevent the light from exiting the body portion through the outer surface of the body portion.

2. The stylus apparatus of claim 1 wherein the manually operable lightpipe is comprised of a transparent material.

3. The stylus apparatus of claim 2 wherein the transparent material is comprised of a polycarbonate.

4. The stylus apparatus of claim 1 wherein the receiving end portion has a plurality of spaced-apart stepped portions.

5. The stylus apparatus of claim 1 wherein the receiving end portion has a conical shape.

6. The stylus apparatus of claim 1 further comprising a tip member, the tip member connected to the receiving end portion of the manually operable lightpipe.

7. The stylus apparatus of claim 6 wherein the tip member has a conical shape.

8. The stylus apparatus of claim 6 wherein the receiving end portion includes an opening formed therein, the tip member received in the opening.

9. The stylus apparatus of claim 6 wherein the tip member has an opaque outer surface.

10. The stylus apparatus of claim 1 wherein the display end portion includes a frosted outer layer to distribute the light.

11. The stylus apparatus of claim 1, wherein the protective cover layer is comprised of santoprene.

12. The stylus apparatus of claim 1 wherein display end portion includes a recess formed therein.

13. The stylus apparatus of claim 12, wherein the recess has a conical shape.

14. The stylus apparatus of claim 1 wherein the manually operable lightpipe has a cylindrical shape.

15. The stylus apparatus of claim 1 wherein the receiving end portion is positioned opposite the display end portion.

16. The stylus apparatus of claim 1 wherein the body portion includes a first portion having a first diameter adjacent to the receiving end portion, a second portion having a second diameter adjacent to the display end portion, and a third portion having a third diameter, the third portion disposed between the first portion and the second portion wherein the third diameter is less than first diameter and the second diameter.

17. The stylus apparatus of claim 16, wherein the first diameter is greater than the second diameter and the third diameter.

18. The stylus apparatus of claim 1 further including a light source in communication with the receiving end portion of the manually operable lightpipe.

19. The stylus apparatus of claim 18, wherein the light source is a light emitting diode.

20. The stylus apparatus of claim 18, further including a circuit board, the light source mounted to the circuit board.

21. A method of transmitting light through a lightpipe apparatus comprising:

providing a stylus with a manually operable lightpipe including a body portion, the body portion including an outer surface comprised of an insulative material, the manually operable lightpipe further including a receiving end portion including a conical tip-member and a display end portion, a protective cover layer positioned over outer surface of the body portion;

transmitting the light into the receiving end portion of the manually operable lightpipe;

transmitting the light from the receiving end portion to the body portion;

transmitting the light through the body portion to the display end portion; and preventing the light from exiting the body portion through the outer surface of the body portion.

22. A personal computing appliance comprising:

an outer protective enclosure including a receiving slot formed therein, a circuit board mounted within protective enclosure, a light source for generating light mounted on the circuit board, a stylus including a lightpipe apparatus disposed within the receiving slot, the lightpipe apparatus comprising a manually operable lightpipe for transmitting the light, the manually operable lightpipe including a body portion for transmitting the light, the body portion including an outer surface comprised of an insulative material, the manually operable lightpipe further including a receiving end portion for receiving the light and a display end portion for displaying the light, a protective cover layer positioned over the outer surface of the body portion to direct the light from the receiving end portion to the display end portion and to prevent the light from exiting the body portion through the outer surface of the body portion.

\* \* \* \* \*